June 30, 1959 D. M. KING 2,892,419
TROLLEY ASSEMBLY FOR CONVEYOR SYSTEMS
Filed June 1, 1955 2 Sheets-Sheet 1
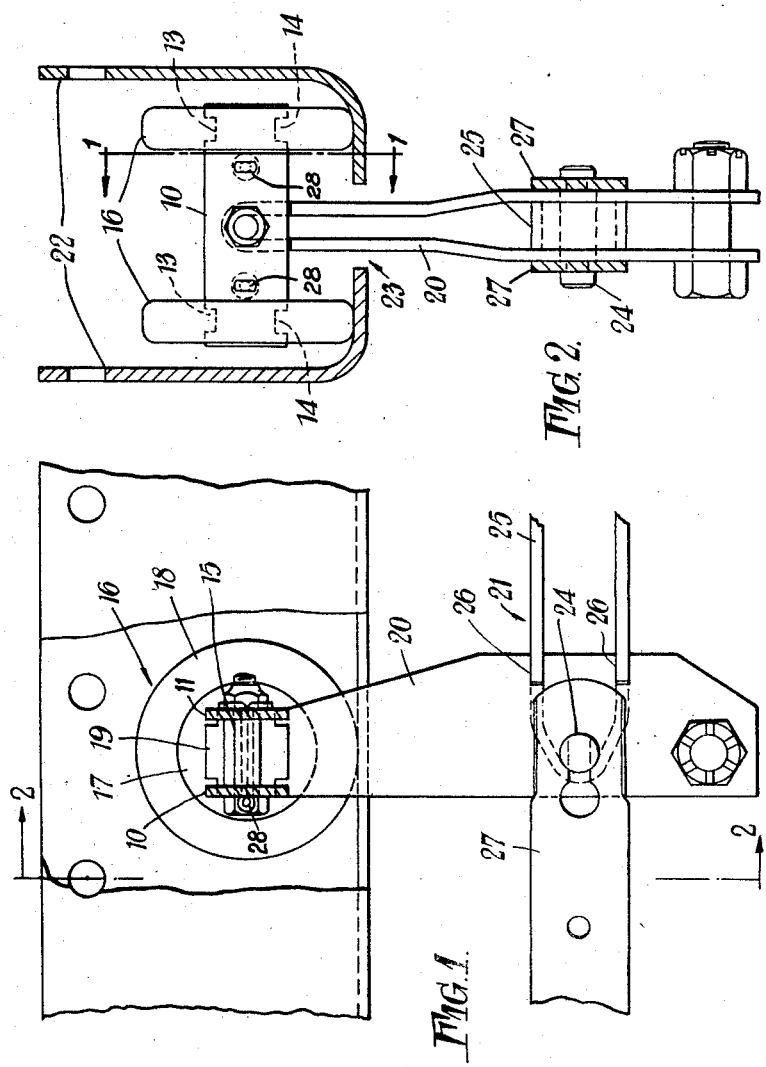

June 30, 1959 D. M. KING 2,892,419
TROLLEY ASSEMBLY FOR CONVEYOR SYSTEMS
Filed June 1, 1955 2 Sheets-Sheet 2
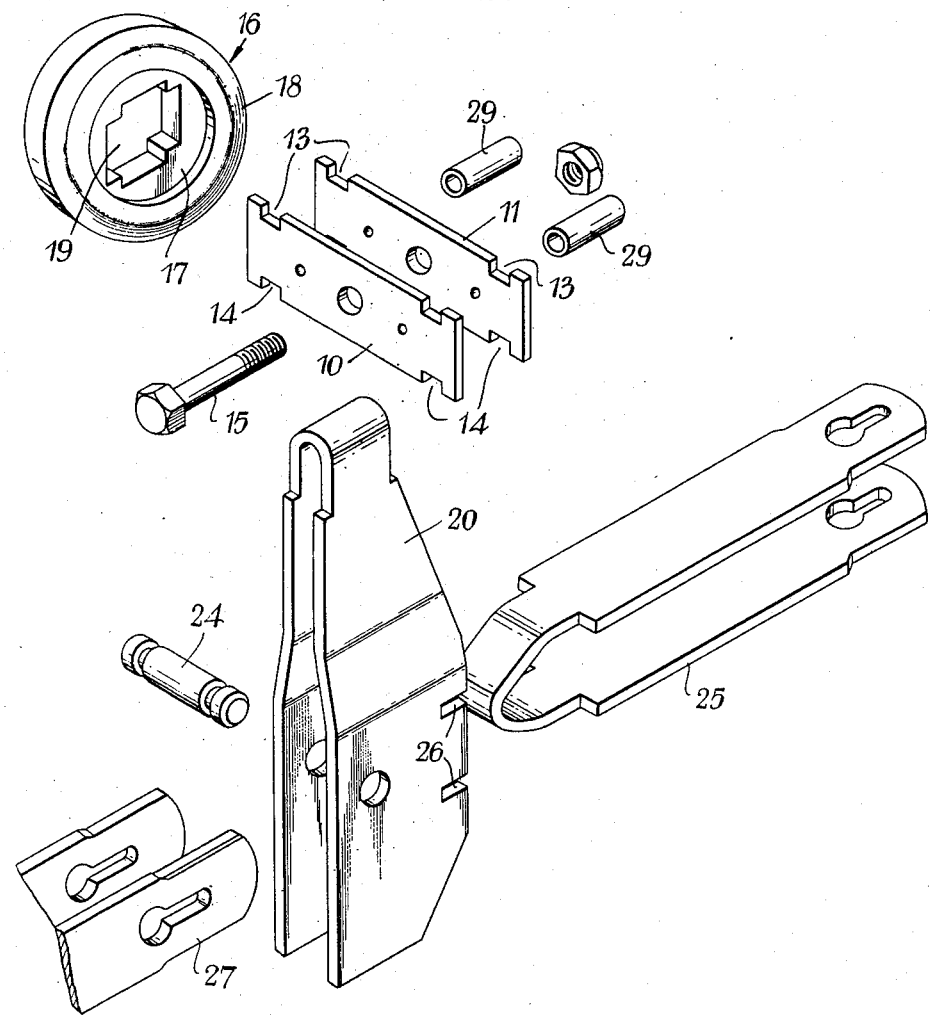

United States Patent Office 2,892,419
Patented June 30, 1959

---

2,892,419

TROLLEY ASSEMBLY FOR CONVEYOR SYSTEMS

Donald Mayer King, Stevenage, England

Application June 1, 1955, Serial No. 512,410

Claims priority, application Great Britain June 14, 1954

3 Claims. (Cl. 105—155)

This invention relates to conveyor systems and more particularly to such systems of the kind wherein an endless driven chain is supported at spaced points along its length by means of load bars or like devices which depend from trolleys adapted freely to travel along a fixed overhead track.

It is the chief object of the invention to provide an improved trolley assembly for use in a conveyor system of the kind indicated.

According to the invention there is provided a trolley assembly for use in a conveyor system of the kind set forth, such assembly comprising a pair of plate like elements disposed in spaced parallel relation, a pair of hub elements supported on said plates at or adjacent opposite ends thereof, said hub elements serving to support freely rotatable wheel or roller members, a load bar or like member adapted to be introduced between the plate like elements thereby to space the same and to prevent displacement of said hub elements therefrom and a single connecting bolt adapted to be introduced through said plate like elements and to secure the load bar or like member in position.

In order that the said invention may be clearly understood and readily carried into effect the same will be hereinafter more fully described with reference to the accompanying drawings in which:

Figure 1 is a side elevational view of a trolley assembly such assembly being shown attached to a conveyor chain and disposed in a fixed overhead track the latter having been partially broken away to permit of illustration of the trolley, Figure 2 is a view taken on the line 2—2 of Figure 1, and Fig. 3 is an exploded view of a portion of the device.

Referring now to the drawings, it will be seen that the trolley comprises a pair of spacer plates 10 and 11 which are identical, each being of generally rectangular form. As can be clearly seen from Figure 2 each plate is formed in each of two opposed edges with a pair of slots or recesses 13, 14 which are disposed adjacent opposite ends of said plate, the slots or recesses 13 in one edge being disposed opposite the corresponding slots or recesses 14 in the other edge of the plates so that in regions adjacent its opposite ends, each plate will have portions of decreased width. Each plate is also formed substantially centrally with an aperture adapted to receive a bolt or the like indicated at 15 and hereinafter referred to. In addition to the aforesaid spacer plates the trolley assembly includes two wheels or rollers designated generally by 16, each comprising a hub portion 17 and an annular rim like portion 18 which is freely rotatable on said hub portion, the latter being formed centrally with an aperture 19 which is substantially cruciform in shape. On assembly of a trolley the spacer plates 10, 11 are disposed in side by side relationship and the wheels or rollers are placed one over each end of the assembled plates which are then moved outwardly relatively to each other so that the portions of decreased width formed by the respective slots or recesses 13, 14 will fit into and engage in the horizontal portions of the cruciform apertures 19 in the hub portions 17 of said wheels or rollers 16. It will be appreciated that in the assembled position the spacer plates 10, 11 will be disposed in spaced parallel relationship and will form a transverse supporting element at the opposite ends of which the wheels or rollers are supported. To complete the trolley assembly the base or closed end of a substantially inverted U-shaped element 20 hereinafter termed the "load fork" is introduced between the spacer plates 10, 11 substantially centrally thereof whereafter the connecting bolt 15 is inserted through the central apertures in said plates, passing in its passage between the limbs of said load fork 20. On application of a nut to said bolt and tightening of the same, the assembly will be secured in position, the portion of the load fork 20 disposed between the plates 10, 11 serving positively to space the latter and to prevent relative inward movement such as would result in their disconnection from the hub portions of the wheels or rollers 16. In order to prevent any possibility of relative tilting movement of the plates 10 and 11 about the axis of the bolt 15 distance pieces 29 may be inserted between said plates such pieces being held in position by means of split pins 28 which are introduced through aligned apertures in said plates. As will be apparent from the drawings, the limbs of the load fork 20 are adapted to depend below the trolley assembly and to provide means for attachment to a conveyor chain indicated at 21 while at the same time allowing for the attachment of load bars or other load supporting devices.

In practice a plurality of trolley assemblies of the kind indicated above, will be provided, such assemblies being disposed within a channeled track 22 having a central longitudinally extending slot or aperture 23 through which the limbs of the respective load forks 20 may project. The load forks 20 will be attached to an endless driven conveyor chain at spaced points along the latter thereby to support the same. As indicated in the drawings the chain may conveniently comprise a plurality of substantially U-shaped links, successive ones of which are turned through 90° relatively to each other and interconnected by means of connecting pins one of which is indicated at 24. In the embodiment illustrated the chain link 25 introduced between the limbs of the load fork 20 is cut away or recessed at its closed end, i.e. at the base of the U, so that it will fit snugly between the limbs of said fork which latter are provided with suitable recesses 26 adapted to receive the shoulders thus present on the limbs of the link so that the latter will be positively located. The outer or free ends of the next adjacent link 27 are adapted to overlie or embrace the limbs of the load fork 20 the arrangement being such that the two links will be coupled together and to said load fork by means of the single connecting pin 24.

As indicated particularly in Figure 2 the track 22 in which the trolleys are adapted to run may be made up of two substantially L-shaped strips which are disposed in spaced parallel relation, the corner or angle of each strip being conveniently radiused or angled thereby to maintain the trolleys substantially centrally of the track.

I claim:

1. For a conveyor system of the kind wherein an endless driven chain is suspended at spaced points from trolleys running on a fixed track, a trolley assembly comprising freely rotatable roller members, a pair of hub elements each having an aperture of substantially cruciform shape therein and each supporting one of the freely rotatable roller members, a pair of plate like elements disposable in parallel relation at a predetermined spacing to engage and support said hub elements in spaced parallel relation and in planes at right angles to those of said plate like elements, each plate like element defining corresponding recesses in opposed edges which recesses cooperate with portions of the cruciform apertures in said hub elements thereby positively to locate the latter with respect to the plate like elements, a load suspension member including a bight portion insertable between said plate like elements and of a width to maintain the requisite spacing between the latter thereby to maintain said hub elements in their operative position and a single securing bolt interconnecting said plate like elements and bight portion whereby also to maintain said load suspension member in the operative position with the plate like member.

2. For a conveyor system of the kind wherein an endless driven chain is suspended at spaced points from trolleys running on a fixed track, a trolley assembly comprising a pair of plate like elements of generally rectangular form each such element having an aperture centrally thereof and two recesses formed in each of two opposed edges, such recesses being disposed adjacent the opposite ends of the respective edges and with corresponding recesses in said opposed edges aligned with each other thereby to provide portions of reduced width adjacent the opposite ends of each plate like element, freely rotatable roller members, a pair of hub elements each having therein an aperture of substantially cruciform shape and each supporting one of said freely rotatable roller members, a load suspension member, and a single connecting bolt, the plate like elements being disposed in side by side relationship, the two hub elements being engaged with opposite ends of said plate like elements and located in the recesses in said plate like elements, the load suspension member including a U-shaped portion defining a channel and being located between the elements for spacing the same, the connecting bolt extending through the central apertures in the elements and the channel to maintain the load suspension member in position and to maintain the spacing of said plate like elements.

3. For a conveyor system of the kind wherein an endless driven chain is suspended at spaced points from trolleys running on a fixed track a trolley assembly comprising two identical plate like elements of generally rectangular form each such element having an aperture centrally thereof and two recesses formed in each of two opposed edges, such recesses being disposed adjacent the opposite ends of the respective edges and with corresponding recesses in said opposed edges aligned with each other thereby to provide portions of reduced width adjacent the opposite ends of each plate like element, freely rotatable roller members, a pair of hub elements each having an aperture of substantially cruciform shape therein and each supporting one of the freely rotatable roller members, a load suspension member of a metal strip of substantially U shape, and a single connecting bolt, the plate like elements being disposed in side by side relation, the two hub elements engaging the opposite ends of said plate like elements and located in the recesses in said plate like elements, the U-shaped strip having its width interposed between and spacing the plate like elements, the connecting bolt extending through the central apertures in the elements and through the U-shaped strip to maintain both the load suspension member in position and the spacing of said plate like elements.

References Cited in the file of this patent

UNITED STATES PATENTS

| 1,178,197 | Wilford | Apr. 4, 1916 |
| 1,447,219 | McBride | Mar. 6, 1923 |
| 1,883,004 | Shafer | Oct. 18, 1932 |

FOREIGN PATENTS

| 645,547 | Great Britain | Nov. 1, 1950 |